(12) United States Patent
Henderson et al.

(10) Patent No.: US 7,121,619 B2
(45) Date of Patent: Oct. 17, 2006

(54) REMOVEABLE FABRIC TOP FOR VEHICLE

(75) Inventors: Jack V. Henderson, West Bloomfield, MI (US); Gregory A. Brower, Fenton, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/521,391

(22) PCT Filed: Jul. 16, 2003

(86) PCT No.: PCT/CA03/01099

§ 371 (c)(1),
(2), (4) Date: Jan. 15, 2005

(87) PCT Pub. No.: WO2004/007225

PCT Pub. Date: Jan. 22, 2004

(65) Prior Publication Data

US 2006/0087157 A1 Apr. 27, 2006

(51) Int. Cl.
*B60J 7/10* (2006.01)
*B60J 7/12* (2006.01)

(52) U.S. Cl. ...................... 296/218; 296/219
(58) Field of Classification Search ................ 296/218, 296/219, 103
See application file for complete search history.

(56) References Cited

U.S. PATENT DOCUMENTS

| | | | |
|---|---|---|---|
| 3,381,996 A | 5/1968 | Horan | |
| 3,494,659 A * | 2/1970 | Trenkler | ...................... 296/218 |
| 3,819,227 A | 6/1974 | Carli | |
| 4,330,150 A | 5/1982 | Dunchock et al. | |
| 4,801,173 A | 1/1989 | Trenkler | |
| 4,898,420 A | 2/1990 | Takada | |
| 5,018,783 A | 5/1991 | Chamings et al. | |
| 5,054,846 A | 10/1991 | Simin et al. | |
| 5,267,774 A | 12/1993 | Garner et al. | |
| 5,725,273 A | 3/1998 | Vernon et al. | |
| 5,979,968 A * | 11/1999 | Essig et al. | ................. 296/102 |
| 6,189,962 B1 * | 2/2001 | Henderson | ................. 296/218 |
| 6,196,616 B1 | 3/2001 | Muszynski | |
| 6,398,296 B1 | 6/2002 | Mayer | |

FOREIGN PATENT DOCUMENTS

| | | | |
|---|---|---|---|
| DE | 100 42 491 | 8/2000 | |
| DE | 199 56 482 | 3/2001 | |
| EP | 0 409 804 | 7/1990 | |
| GB | 1162627 | * 8/1969 | ................. 296/218 |
| RU | 884624 | 7/1980 | |

* cited by examiner

*Primary Examiner*—Dennis H. Pedder
(74) *Attorney, Agent, or Firm*—Clark Hill PLC

(57) ABSTRACT

A top assembly (24) selectively covers an open top motor vehicle. The open top motor vehicle has a front mounting edge (12) and a rear mounting edge (14). The top assembly (24) includes a fabric sheet (26) and retainers (32, 34) fixedly secured along front (28) and rear (30) edges of the fabric for sealingly engaging with the front and rear edges of the open top. A pair of side frame members (31, 33) pivotally engages opposite sides of the front and rear retainers (32, 34). The side frame members (31, 33) are movable between a locked condition and a folded condition. When the side frame members are locked, the front and rear retainers (32, 34) are spaced apart drawing out said fabric sheet (26) and sealingly engaging the front and rear edges (12, 14) of the vehicle top opening. When the side frame members (31, 33) are unlocked, the top assembly folds for removal from the vehicle and storage.

10 Claims, 4 Drawing Sheets

REMOVEABLE FABRIC TOP FOR VEHICLE

FIELD OF THE INVENTION

The invention relates to a top assembly for a motor vehicle. More particularly, this invention relates to a top assembly for selectively covering a passenger compartment of a motor vehicle.

DESCRIPTION OF RELATED ART

Motor vehicles may have an opening over a passenger compartment that is selectively covered to allow light and ventilation therein. Typically, the opening is covered by a top, which can be either a rigid panel or a fabric top. The panels are formed from a metal or composite material. The fabric for the fabric top may be chosen from vinyl, canvas, or any other suitable material. The top can be removed during favorable weather conditions to afford motor vehicle occupants added comfort. Alternatively, the top can be installed over the opening during unfavorable weather conditions or for safekeeping of items left in the passenger compartment while the motor vehicle is parked.

Easy installation and removal of the top are important considerations in the practicality thereof. Ideally, an individual should have to exert minimal physical effort and spend only a small amount of time to maneuver the top into or out of position. Many tops, however, are heavy and/or cumbersome making it difficult for many individuals to easily install or remove the top when desired.

Another consideration in the practicality of a top is storage of the top upon removal. If the top occupies a large amount of cargo space in the motor vehicle, an individual may decide to simply leave the top behind at a place to which the individual is to return. While this saves cargo space, it can be inconvenient when weather conditions become unfavorable during operation of the motor vehicle. Thus, a top that may be folded upon removal so that the top occupies only a small amount of cargo space while stored in the motor vehicle is desirable.

SUMMARY OF THE INVENTION

The disadvantages of the prior art may be overcome by providing a top assembly that is easily and conveniently installed and removed, while being compactly storable in the vehicle.

According to one aspect of the invention, there is provided a top assembly that selectively covers an open top motor vehicle. The open top motor vehicle has a front mounting edge and a rear mounting edge. The top assembly includes a fabric sheet and retainers fixedly secured along front and rear edges of the fabric for sealingly engaging with the front and rear edges of the open top. A pair of side frame members pivotally engages opposite sides of the front and rear retainers. The side frame members are movable between a locked condition and a folded condition. When the side frame members are locked, the front and rear retainers are spaced apart drawing out said fabric sheet and sealingly engaging the front and rear mounting edges of the vehicle top opening. When the side frame members are unlocked, the top assembly folds for removal from the vehicle and storage.

DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
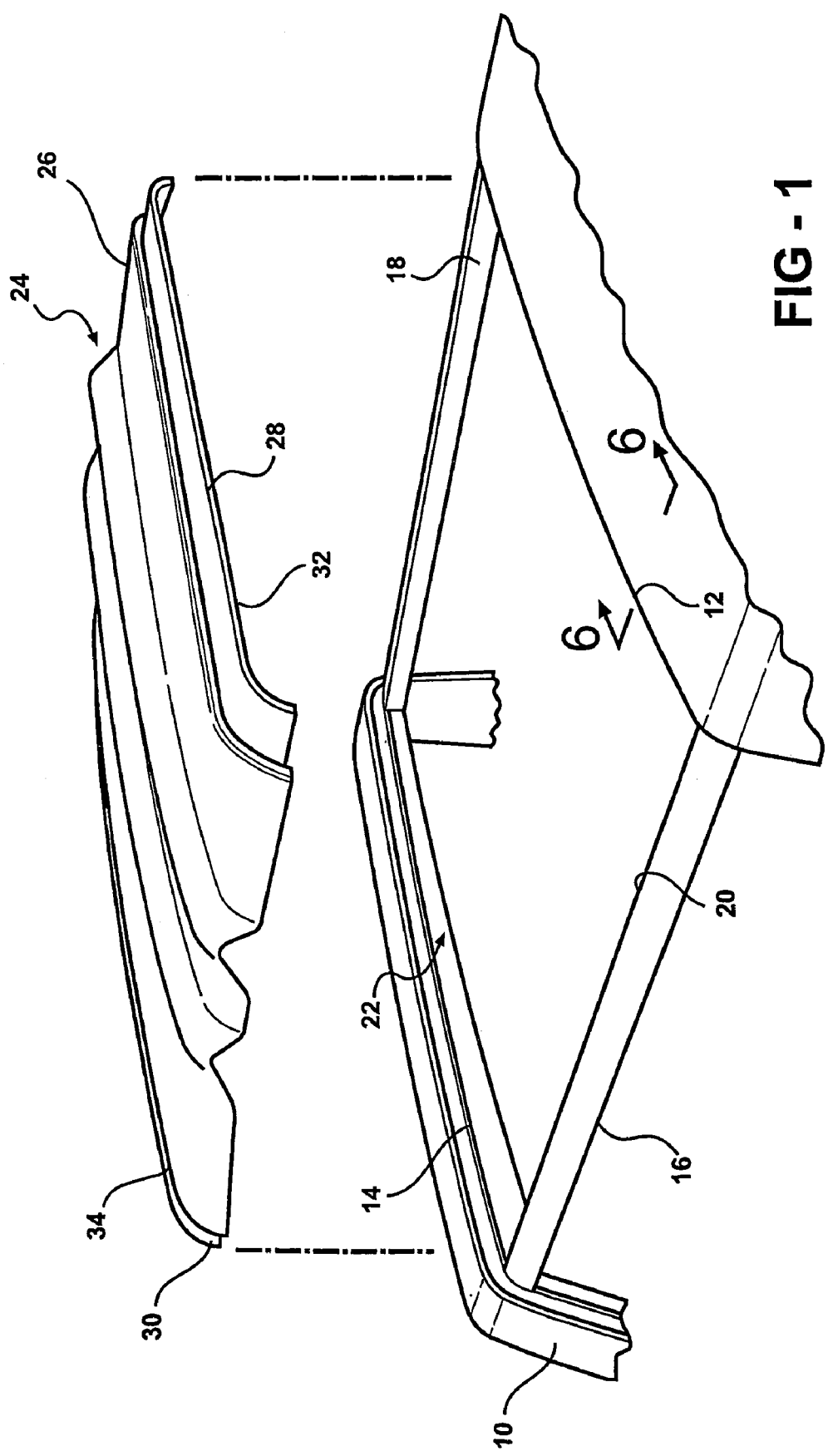
FIG. 1 is a partially cut-away, perspective view of a top assembly of one embodiment of the invention positioned over an open top motor vehicle.

Referring to FIG. 1, a motor vehicle 10 has an open top that includes a front mounting edge 12, a rear mounting edge 14, and a pair of side frames 16, 18 extending therebetween. The front 12 and rear 14 mounting edges, and the pair of side frames 16, 18 define an opening 20 through which light and ventilation enters an underlying passenger compartment, generally shown at 22.

The top assembly 24 selectively covers the passenger compartment 22. When the top assembly 24 is in place, the top assembly 24 provides a barrier to the elements of the environment thereabove. Top assembly 24 includes a fabric sheet 26 extending between a front fabric edge 28 and a rear fabric edge 30. The fabric sheet 26 may be made from canvas, vinyl, or any other suitable flexible material that provides a weather barrier.

Figure 2:
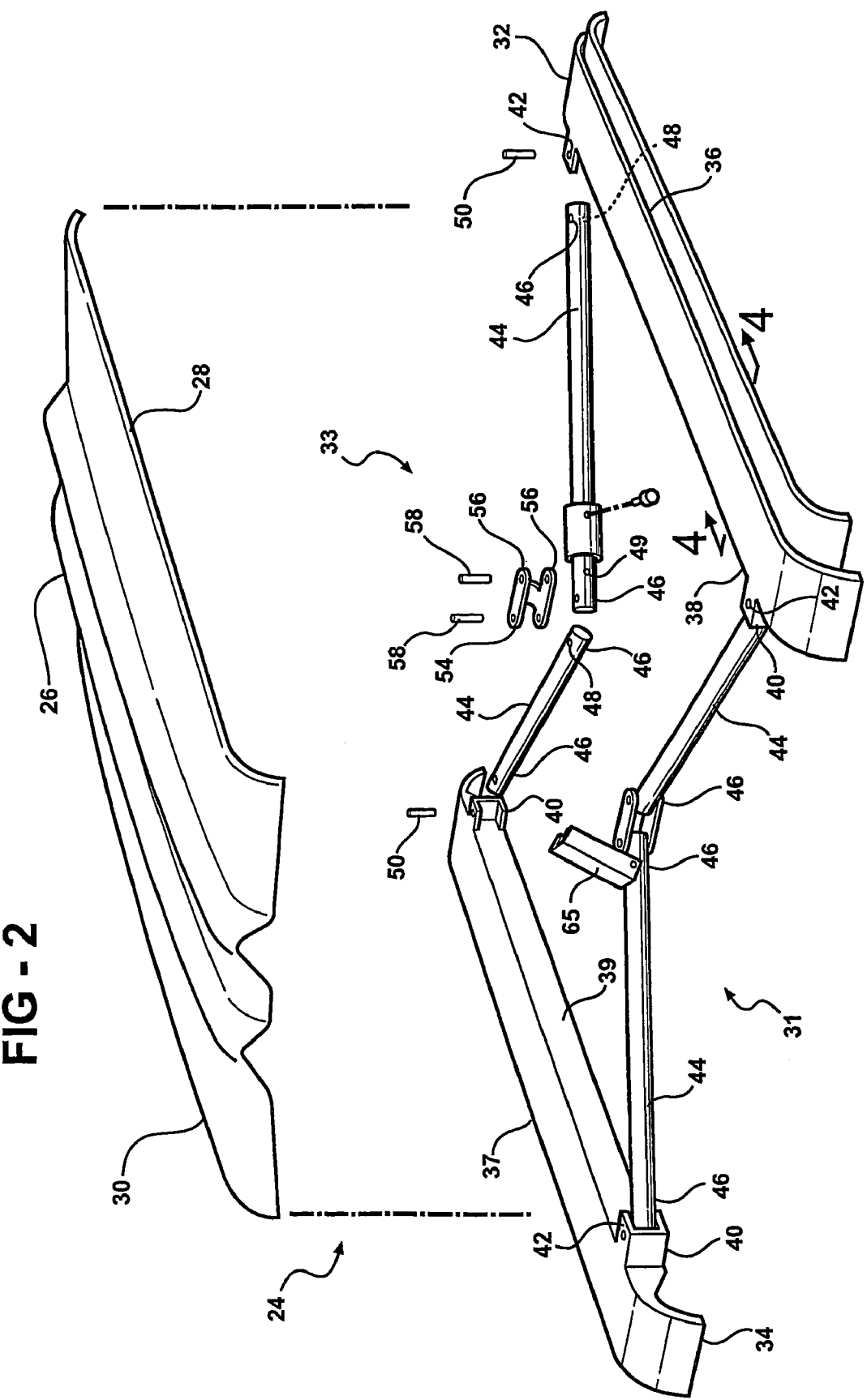
FIG. 2 is an exploded, perspective view of the top assembly of one embodiment of the invention.

Referring to FIG. 2, the top assembly 24 also includes a front retainer 32 and a rear retainer 34 and side frame members 31, 33 extending between the front and rear retainers 32, 34. The front 32 and rear 34 retainers are configured to sealingly engage with the front and rear edges mounting edges 12, 14. Each retainer 32, 34 has an outer edge 36, 37 and an inner edge 38, 39. Mounting brackets 40 extend from the inner edges 38, 39 of the front 32 and rear 34 retainers, at opposite sides thereof. Each of the mounting brackets 40 has an aperture 42.

The side frame members 31, 33 each comprise a pair of struts 44 that are pivotally connected to the mounting brackets 40 and a locking mechanism. Each strut end 46 has through apertures 48. One of the strut apertures 48 aligns with the aperture 42 of one of the mounting brackets 40. A pin 50 extends through each of the strut apertures 48 and the aperture 42 to pivotally secure the struts 44 to the front 32 or rear 34 retainer.

The locking mechanism comprises a U-shaped link 52 pivotally struts the struts 44 on opposite sides to another one. The U-shaped link 52 has a pair of first link apertures 54 and a second pair of link apertures 56. The first pair of link apertures 54 aligns with the plurality of strut apertures 48 at one of the pair of strut ends 46 of one of the pair of struts 44. The second pair of link apertures 56 aligns with the plurality of strut apertures 48 at one of the pair of strut ends 46 of another of the plurality of struts 44. Pins 58 extend through the first 54 and second 56 pair of link apertures and through the corresponding plurality of strut apertures 48.

Figure 3:
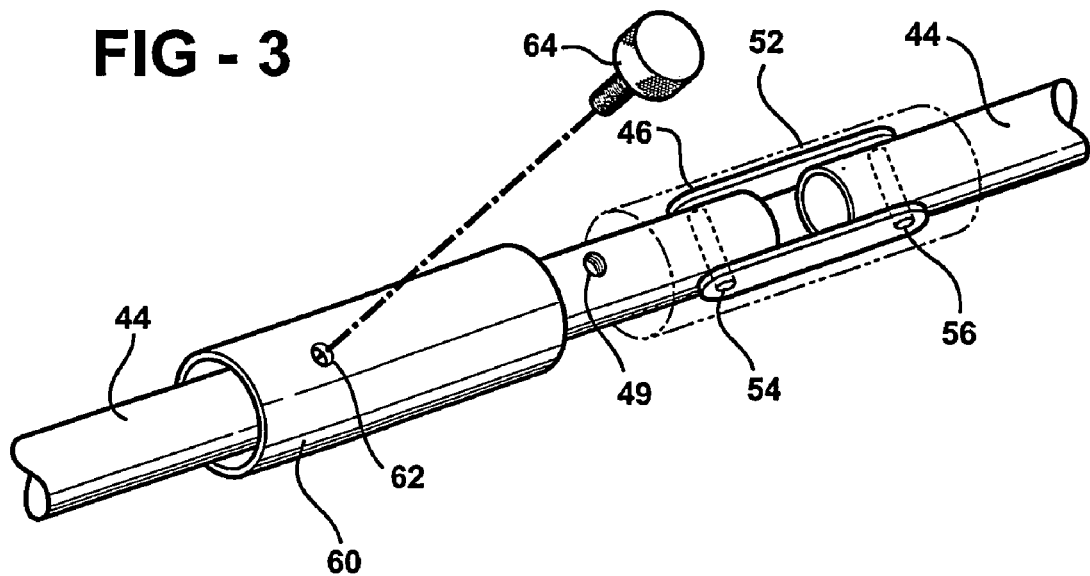
FIG. 3 is an enlarged, perspective view of a sleeve of the top assembly of one embodiment of the invention.

Referring to FIG. 3, a sleeve 60 has a greater diameter than strut 44 and is coaxially mounted to slidingly engage the strut 44. The sleeve 60 has an aperture 62, which is selectively aligned with the sleeve locking aperture 49 located at one end of the strut 44. A thumb screw 64 extends through the aperture 62 and the sleeve locking aperture 49 to lock the sleeve 60 over the U-shaped link 52, preventing pivoting movement therebetween and keep the top assembly 24 in an extended and locked condition (shown in FIG. 2), wherein the struts 44 are aligned. Selectively, the thumb screw 64 may be removed from the sleeve locking aperture 49 allowing the sleeve 60 to move to a position adjacent the U-shaped link 52 (as seen in FIG. 3). When the sleeve 60 is disposed adjacent the U-shaped link 52, the struts 44 are allowed to pivot relative to the U-shaped link 52 until the top assembly 24 reaches a folded condition, wherein the struts 44 extend parallel to each other. The top assembly 24 may then be conveniently stored in a portion of the cargo space (not shown) of the open top motor vehicle 10.

Referring back to FIG. 2, an alternative locking mechanism is illustrated. Clip 65 is pivotally secured to one of the struts 44 and positioned to overlay the link 52. In the locked position, the clip 65 pivots to cover the U-shaped link 52, which keeps the top assembly 24 in the extended position. When the clip 65 is pivoted away from the link 52, the top assembly 24 may be moved into the folded position. It is apparent to those skilled in the art that other locking mechanisms may be utilized to lock the struts 44 in an aligned position and unlock the struts 44 to enable folding.

Preferably, struts 44 have a length of less than half of the longitudinal extend of the opening 20. This sizing allows the front and rear retainers 32, 34 to abut each other when in the folded condition. Mounting brackets 40 have a length slightly greater than the diameter of the struts 44 enabling the struts 44 to fold and the front and rear retainers 32, 34 to abut.

Figure 4:
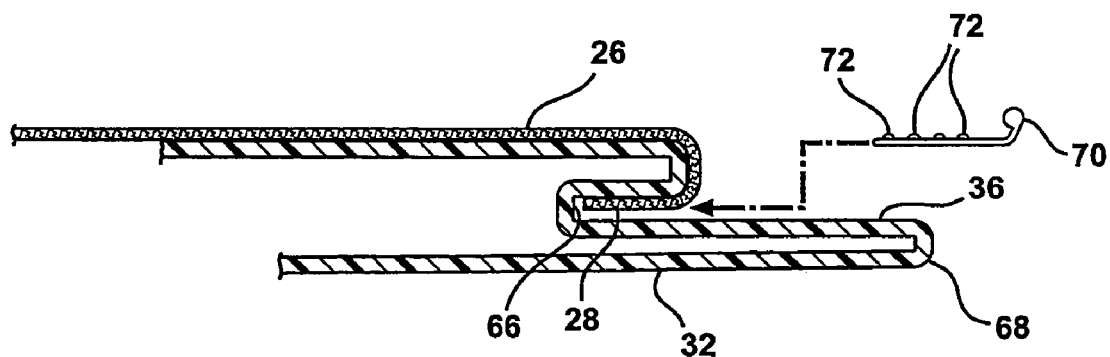
FIG. 4 is an enlarged, cross-sectional side view of the front retainer of the top assembly of one embodiment of the invention.
Figure 5:
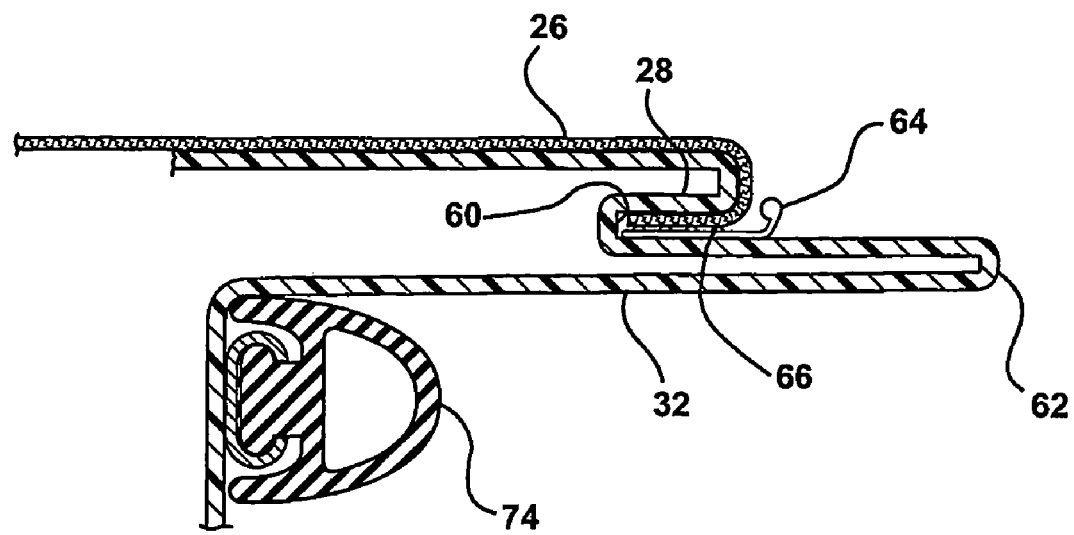
FIG. 5 is an enlarged, cross-sectional side view of the front retainer of the top assembly of one embodiment of the invention including a seal.

Only the front retainer 32 is shown in FIGS. 4 and 5. However, the front 32 and rear 34 retainers are identical so that reference is made only to the front retainer 32 with the knowledge that the same is equally applicable to the rear retainer 34. Preferably, retainers 32, 34 are molded from a common mold with an organic plastic material. If a two cavity mold is employed, each cavity can be configured for the front and rear retainer 32, 34 respectively. Alternatively, a single cavity mold could be employed to mold a retainer. Two like retainers are then placed in a back to back condition to assemble the top assembly 24.

The front retainer 32 has an inwardly extending transverse slot 66 and an outwardly extending tongue 68 all along the outer edge 36 thereof. A compression lace 70 may be inserted into the slot 66 of the front retainer 32 after the front fabric edge 28 of the fabric sheet 26 has been inserted therewithin to frictionally engage therewith. The compression lace 70 is elongated and has a plurality of barbs 72 therealong to anchor the compression lace 70 within the slot 66 and to securely retain the fabric sheet 26 therein. A seal 74 extends all along the outer edge 36 of the front retainer 32 to sealingly engage the front retainer 32 to the front mounting edge 12, as described in further detail below.

Figure 6:
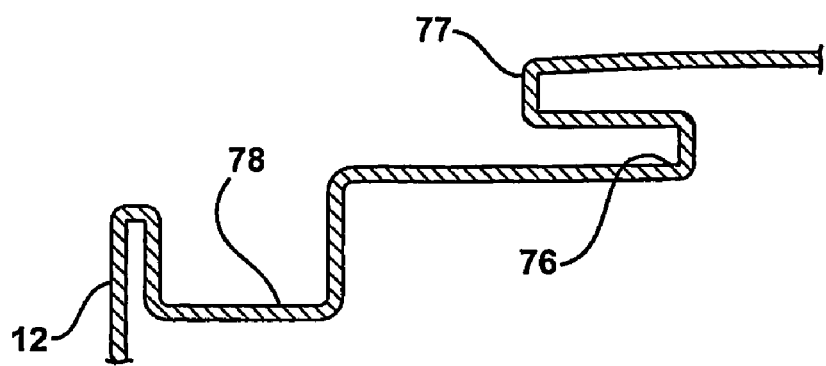
FIG. 6 is a cross-sectional side view taken along lines 6—6 in FIG. 1 of a front mounting edge of the open top motor vehicle to which the top assembly of one embodiment of the invention sealingly engages.

Referring to FIG. 6, the front 12 mounting edge is illustrated noting that the front and rear mounting edges correspond. Front mounting edge 12 has an outwardly extending transverse groove 76 and a water trough 78. The transverse groove 76 defines an overhang 77 that merges with the vehicle roof. The water trough 78 provides a path directing transversely the water away from the passenger compartment 22. The tongue 68 of the front retainer 32 complementarily mates with the groove 76 of the front mounting edge 12 to secure the front retainer 32 thereto. At the same time, the seal 74 compresses against the front mounting edge 12 to provide a sealed attachment of the front retainer 32 to the front mounting edge 12.

In use, the top assembly 24 is in the stored and folded condition. The side frame members 31 and 33 are unlocked and folded. The front and rear retainers 32, 34 are positioned together so that the fabric 26 is loose. The top assembly 24 is placed on the side frames 16, 18. The operator pushes the front and rear retainers 32, 34 apart drawing out the fabric sheet 26 until the side frame members 31, 33 are unfolded and fully extended and the front and rear retainers 32, 34 engage the front and rear mounting edges 12, 14. The tongue 68 will engage the groove 76. The seal 74 engages against the side wall of the water trough 78 providing a substantially watertight seal. Once the struts 44 are aligned, the locking mechanism can be engaged to lock the side frame members 31, 33 in the locked condition. In this condition, the fabric sheet 26 is taut and substantially co-planar the adjacent portions of the vehicle roof.

To remove, the locking mechanism is unlocked, the side frame members 31, 33 are folded and the top assembly 24 is folded for removal and storage.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A top assembly for selectively covering a passenger compartment of a motor vehicle, said top assembly comprising:

a waterproof fabric sheet having a front edge and an opposing rear edge;

a front retainer having an inwardly extending transverse slot all along an outer edge for receiving said front edge of said fabric sheet;

a rear retainer having an inwardly extending transverse slot all along an outer edge for receiving said rear edge of said fabric sheet; and a pair of side frame members pivotally engaging opposite sides of said front and rear retainers of said side frame members movable between a locked condition and a folded condition, when said side frame members are in said locked condition, said front and rear retainers are spaced apart drawing out said fabric sheet.

2. A top assembly as set forth in claim 1, wherein said pair of side frame members each comprises a pair of struts pivotally connected to each other at one end and to said front and rear retainers respectively at opposite ends thereof, and a locking mechanism, said locking mechanism selectively locking said struts when said struts are aligned.

3. A top assembly as set forth in claim 2, further comprising at least two compression laces, each engagable with a respective one of said front and rear retainers to sealingly secure said fabric sheet thereto.

4. A top assembly as set forth in claim 3, wherein each of said compression laces has a plurality of barbs that enhance frictional engagement between the fabric sheet and retainer.

5. A top assembly as forth in claim 2, wherein said pivot connection between said struts comprises a link pivotally connecting ends of said struts.

6. A top assembly as set forth in claim 5, wherein said locking mechanism comprises a sleeve slidable along one strut of said pair of struts and moves between a locking position wherein said sleeve extends over said link preventing pivotal movement between said pair of struts and an unlocked position away from said link enabling folding of said struts.

7. A top assembly as set forth claimed in claim 6, wherein said locking mechanism further comprises a screw extending between said sleeve and said strut selectively securing said sleeve in the locking position.

8. A top assembly as set forth in claim 5, wherein said locking mechanism comprises a clip pivotally mounted on one of said struts and moves between a locking position wherein said clip extends over said link preventing pivotal movement between said pair of struts and an unlocked position away from said link enabling folding of said struts.

9. A top assembly as set forth in claim 1, wherein said top assembly expands to engage front and rear edges of a vehicle top opening to cover a passenger compartment in a watertight engagement and folds for removal from said vehicle.

10. A top assembly as set forth in claim 9, wherein each of said retainers has a transverse seal that engages said front and rear edges when said top assembly is installed on said vehicle.

* * * * *